3,126,350
CATIONIC BITUMINOUS EMULSIONS
Merton J. Borgfeldt, San Francisco, Calif., assignor to California Research Corporation, San Francisco, Calif., a corporation of Delaware
No Drawing. Filed Mar. 1, 1961, Ser. No. 92,476
5 Claims. (Cl. 252—311.5)

The present invention relates to the production of cationic bituminous emulsions. More particularly it relates to the production, with the aid of a particular emulsifying agent, of oil-in-water type cationic bituminous emulsions which display excellent mechanical stability, particularly on being mixed with stone aggregates which are characterized by the presence of as much as 20% by weight of finer materials of less than 200 mesh size.

In certain paving applications which use asphalt and other similar bituminous materials, for instance, in slurry seal mixtures, bitumen is emulsified in water with the aid of conventional alkaline base emulsifiers, and the emulsified bitumen is then mixed with sand containing substantial proportions of fines. In another type of paving application, namely, in base stabilization work, when well-graded gravel or crushed stone aggregate is not available, the bituminous binder emulsified in conventional fashion is mixed with lower grade materials, such as aggregates which may contain considerable admixture of non-cohesive sand and clay. Still in another type of paving structure, namely, in floor mastics, a similarly emulsified bitumen, such as an asphalt, is mixed with sand, coarse aggregate and Portland cement.

The dense-mixing grade (SS-Type) bituminous emulsions, which are employed to prepare the aforementioned densely-graded fine aggregate-containing mixes, must be specially formulated to permit easy handling and ready application in paving work. They must remain stable (must not break down at once) on being mixed with fine materials, such as particles of Portland cement, fine sand, pit-run, crusher-run, and clay-bearing aggregates, but, once applied to the surface being paved or repaired, they should dehydrate rapidly and satisfactorily, and should display thorough penetration and firm adhesion of the bituminous binder to the aggregate, so as to form a satisfactory pavement base, slurry seal or a floor surface.

Until recently anionic asphalt emulsions, that is emulsions prepared by emulsifying asphalt in water with the aid of an alkaline base or a stable anion-active soap, have been usually employed for the preparation of dense-mixing grade emulsions.

The task of properly choosing the components of these emulsions is by no means simple and requires selection of additional stabilizers to assure compatibility with sand and other low-grade finer aggregates, as well as addition of adhesion agents to obtain the desired bonding of the asphalt binder.

A few years ago cationic asphalt emulsions made their appearance on the market. However, it soon became apparent to the formulators and applicators of these emulsions that cationic emulsions prepared with the aid of cation-active emulsifiers then available in commerce, such as salts of alkyl amines, salts of alkyl-substituted imidazolines, quaternary ammonium salts, etc., could not be successfully employed for the preparation of paving mixed with fine sand, with densely graded aggregates or with Portland cement.

The stability of these emulsions just did not hold up on their being mixed with cement, sand, or with densely graded aggregates; stable mixtures were difficult to produce, if at all, and invariably failed, upon application on paving jobs, to provide a good bond with the aggregate, owing to inadequate adhesion.

I have found that cationic asphalt emulsions capable of producing satisfactory, stable mixes with stone aggregates containing up to 20% by weight of such materials as fine sand, sand silt, and/or fine low-grade components, such as pit-run and crusher-run aggregates containing fines, clay, etc., may be prepared with the aid of certain amine-type materials derived from lignin as effective emulsifiers for emulsifying asphalt in water.

These amine materials, designated hereinafter as "lignin amines," are advantageously produced by the so-called Mannich reaction, in accordance with the procedure described in the U.S. Patent No. 2,863,780, issued December 9, 1958, to John Corning Ball, Jr. In this reaction, lignin is reacted with a primary or secondary amine and formaldehyde, although other aldehydes and equivalent ketones may be also employed, for instance, acrylaldehyde, benzaldehyde, acetaldehyde, etc., as well as acetone, isophorone, and the like.

The lignin may be derived from any available source of supply, e.g., wood, bagasse, straw, corncobs, etc. whence it can be extracted by known methods such as pulping of the wood, the sulfate method, the soda method, acid hydrolysis and solvent extraction. Sulfonated lignin may be also employed for the reaction.

The amine may be any suitable primary or secondary amine, for instance, dimethyl amine, morpholine, butyl amine, etc.

The lignin amine material, resulting from the reaction of lignin with the amine and the aldehyde, is normally added to the water in which the asphalt will be emulsified, and the pH of the solution is adjusted to a value from about 1.0 to about 3.0, the pH range of from about 1.5 to about 2.0 being preferred. The pH adjustment is effected by adding a suitable acid, for instance, hydrochloric, nitric, phosphoric, and the like. Thereafter, the emulsion of asphalt in water is formed in the conventional manner, agitating the combined two phases (water and asphalt) in a suitable piece of equipment, such as a colloid mill.

The emulsions thus prepared will have a pH in the range from about 1.0 to about 4.5, preferably from about 1.5 to about 3.5, and its asphalt content may range from about 30 to about 75% by weight, the lignin amine salt emulsifier being present in the final emulsion in a concentration ranging from about 0.2 to about 2.0% by weight, water making up the balance of the emulsion to 100% by weight. Particularly satisfactory are those emulsions characterized by an asphalt content of from about 55 to about 65% by weight. Practically any asphalt with penetration values ranging from about 40 to about 300 may be emulsified with the aid of the particular emulsifier of the invention.

If desired, known conventional compatible additives may be employed in small amounts, provided they do not affect the emulsification adversely and do not impair the improved properties of the emulsion attained in accordance with the invention.

Suprisingly, satisfactory cationic emulsions are achieved when the pH of the aqueous phase containing the lignin amine emulsifier is in the range from about 1.0 to about 3.0, the optimum lying between about 1.5 and about 2.0. Below the pH of 1.0 corrosion difficulties occur, while when the pH of the emulsifying water in the cationic (acid) range is between 3.0 and 7.0, an adequate stability on mixing with, and adhesion to, finer low-grade aggregates, sand and cement particles cannot be obtained.

If so desired, and in order to impart certain advantageous properties to the emulsion, auxiliary cationic or non-ionic emulsifiers may be used, along with lignin amine, in the preparation of the emulsions. The concentration of these auxiliary emulsifiers will generally lie in the range of from about 0.01% to about 2% by weight.

Thus, a non-ionic emulsifier, for instance, one of the ethylene glycol polyethers sold in the trade under the trade-marked designation of "Igepals" may be added to enhance "pumpability," that is, ease of pumping of the emulsion.

In some instances, one may wish to add a cationic auxiliary emulsifier, for instance, an N-alkyl trimethylene diamine from the group of materials known in the trade under the trade-marked designation of "Duomeens," or yet an alkyl-substituted imidazoline from the group of materials sold under the trademarked designation of "Nalcamines," an example of this latter being "Nalcamine G-39M" which is a 1-(2-aminoethyl)-2-n-alkyl-2-imidazoline. When added in the aforementioned amounts of from about 0.01 to about 2.0% by weight, these auxiliary cationic emulsifiers provide for a better, homogeneous distribution of the bituminous binder in fine, relatively uniform particles; in other words, the emulsion is made to conform closely with the ASTM D-244 Sieve Test, can be more easily handled through pumps and spray nozzles, and will set satisfactorily upon application on the paving job.

The lignin amine material employed to emulsify the asphalt, or other like bituminous binder, in accordance with the invention, is added to the aqueous phase either as such or in the form of water-soluble salts, e.g., as hydrochloride salts or as alkali metal salts of lignin amine, adjusting the acidity (pH) to the desired operative value bu the addition of an acid, as mentioned hereinbefore.

After the emulsion has been prepared, it may be either stored until being required at, and transported to, the job; or it may be mixed with the aggregate corresponding to the intended application at a central plant in a large pugmill or a cement-mixer; or yet it may be taken immediately to the job site to be mixed there with the aggregate in available motorized mixing equipment or even manually, in the absence of such equipment.

An extensive series of tests has been carried out to confirm the improvement in the properties of cationic bituminous emulsions, when prepared in accordance with the invention. Results of several representative tests of this series are offered hereinafter. For these tests, several different asphalts were used, and the lignin amine emulsifier, in the form of an alkali metal salt of lignin amine, was employed either alone or accompanied by auxiliary emulsifiers.

In each case, the emulsion was prepared by dissolving the lignin amine (as sodium salt) in water, adjusting the pH of the solution with hydrochloric acid to a figure in the range from about 1.0 to about 3.0, adding auxiliary emulsifiers whenever desired, and then emulsifying the asphalt heated to fluidity in a colloid mill. The resulting emulsions were subsequently subjected to the following tests:

*Cement test.*—This test, representing a modification of ASTM D-244 test, served to determine the extent of breakdown or coagulation upon mixing the emulsion with Portland cement. The test procedure consisted of placing 50 g. of cement sifted through a sieve of 80 mesh into a 500 ml. porcelain cup. An amount of the emulsion diluted to 55% asphalt residue was placed into a 100 ml. graduate which was then filled to the 100 ml. mark with water, and the contents mixed. The diluted emulsion was then poured over the cement in the cup, and the mixture stirred at approximately 60 r.p.m. for one minute, maintaining the temperature between 160 to 180° F. Distilled water in an amount equal to 150 ml. was added and stirred for three minutes. This mixture was in turn poured over a previously weighed 14 mesh sieve ($W_S$). The cup was rinsed with distilled water, and the rinsing repeated, pouring the rinsing through the sieve until the drainings no longer were colored. A can lid of sufficient size to hold the sieve was weighed ($W_L$). The sieve and its contents placed in this lid were then dehydrated on a hot plate adjusted to a low temperature. After cooling, the can lid and the sieve were weighed.

The cement test residue ($C_R$) is determined by subtracting from the weight of the lid and the sieve after dehydrating ($W_R$) the sum of the tared weights of the sieve ($W_S$) and of the lid ($W_L$). The value ($C_R$) exceeding 3 grams is considered not to pass the test.

*Sieve test.*—In this test, likewise a modification of ASTM D-244 test, 1 kilogram of the emulsion was poured through weighed sieves of different mesh sizes, moistened with a 2% solution of sodium oleate.

After drying for 2 hours at 220° F. the sieve was reweighed, and the percentage of the solid phase retained was determined. The results indicate the average degree of dispersion (particle size) of the solid phase of the emulsion.

*Adhesion test.*—In this test, 100 grams of aggregate, passing through a ⅜" screen and retained on a No. 10 sieve, was washed with distilled water and then air-dried. Thereupon eight grams of the emulsion heated to 120° F. was added to the aggregate at room temperature and mixed thoroughly therewith. The resulting mixture was placed for 24 hours into an oven at 200° F., following which period the sample was remixed until each stone appeared thoroughly coated. One half of the coated mixture was then placed in a 600 ml. beaker containing 400 ml. of boiling distilled water and stirred vigorously for one minute at 60 r.p.m. When the boiling was stopped, the asphalt floating on the surface was skimmed off with absorbent paper. The sample of the aggregate was removed with a spoon and placed on absorbent paper for air-drying. The percentage of adhesion of the asphalt was estimated visually for each sample.

The data from the above described three tests (Cement, Sieve and Adhesion) are shown in the following Table I:

TABLE I

|  | I | II | III | IV | V | VI | VII |
|---|---|---|---|---|---|---|---|
| Asphalts A, B and C in percent by wt.: |  |  |  |  |  |  |  |
| A, 50-60 penetration; acid value about 0.8 | 58.0 |  |  |  |  |  |  |
| A, 150-200 penetration; acid value about 1.0 |  | 59.0 | 59.0 | 59.0 | 59.0 |  |  |
| B, 150-200 penetration; acid value about 3.5 |  |  |  |  |  | 59.0 |  |
| C, 150-200 penetration; acidity—nil |  |  |  |  |  |  | 59.0 |
| Lignin Amine in percent by wt | 1.0 | 1.0 | 1.0 | 1.0 | 1.0 | 1.0 | 1.0 |
| Nalcamine G-39 M in percent by wt | 0.05 |  | 0.02 | 0.06 | 0.08 |  |  |
| HCl (20° Bé), in percent by wt | 0.51 | 0.46 | 0.46 | 0.48 | 0.48 | 0.46 | 0.46 |
| Water in percent by wt | 40.04 | 39.54 | 39.52 | 39.46 | 39.44 | 39.54 | 39.54 |
| pH of the emulsifying water | 1.7 | 1.6 | 1.6 | 1.7 | 1.8 | 1.7 | 1.6 |
| Test Results: |  |  |  |  |  |  |  |
| Asphalt Residue in percent by wt | 58.2 | 58.0 | 58.4 | 59.2 | 59.2 | 57.2 | 59.0 |
| Cement Test, Residue in g | Trace | 0.05 | 0.15 | 0.05 | 0.10 | Trace | Trace |
| Sieve Test, percent by wt. retained on— |  |  |  |  |  |  |  |
| 20 mesh screen | 0.9 | 0.35 | Trace | 0.5 | Trace | Trace | Trace |
| 40 mesh screen | 0.91 | 0.20 | Trace | 0.05 | 0.10 | Trace | Trace |
| 80 mesh screen | 0.05 | 0.40 | 0.30 | 0.20 | 0.35 | 0.25 | 0.10 |
| Adhesion in percent— |  |  |  |  |  |  |  |
| On silica | 100 |  |  |  |  |  |  |
| On limestone | 100 |  |  |  |  |  |  |

As readily noted from the results in the above table, the emulsions are remarkably stable on admixture of cement and show very low sieve values. Adhesion to either siliceous or limestone aggregates is excellent.

Additionally, abrasion resistance and dehydration rates of slurry seal coatings formulated in accordance with the invention from cationic asphalt emulsions and siliceous aggregate with the aid of lignin amine as the emulsifier were compared with the abrasion resistance and dehydration rates of slurry seal coatings formulated from a conventional anionic emulsion.

The cationic emulsion was made up of the following components:

| | Percent by weight |
|---|---|
| Asphalt of 50–60 penetration; acid value about 0.8 | 58.0 |
| Lignin amine | 1.0 |
| Nalcamine G–39 M | 0.05 |
| MCl (20° Bé.) | 0.51 |
| Non-ionic material sold under the trademark "Igepal 990" | 0.50 |
| Water, balance to | 100.00 |

The anionic emulsion employed for a comparison consisted of:

| | Percent by weight |
|---|---|
| Asphalt of 50–60 penetration; acid value about 0.8 | 58.0 |
| Pinewood resin sold under the trademark "Vinsol" | 2.0 |
| NaOH | 0.22 |
| Water, balance, to | 100.00 |

A graded siliceous aggregate with the following screen analysis was employed to prepare the slurry seal mix.

| Sieve No. | Percent passing |
|---|---|
| 8 | 100 |
| 16 | 94 |
| 30 | 88 |
| 50 | 66 |
| 100 | 30 |
| 200 | 15 |

Test samples were prepared using various amounts of the two asphalt emulsions and spreading the emulsion on circular pads of 60 lb. roofing felt, ⅛″ thick and 11¼″ in diameter. These pads were weighed and allowed to stand for 3 hours at a temperature of 75° F. and a relative humidity of 50–60%; during this period, the pads were weighed at 30 minute intervals. The percent moisture, based on the weight of dry aggregate, was calculated after each weighing. The rates of dehydration thus obtained are tabulated in the following table:

TABLE II

*Rate of Dehydration of Slurry Seal Coats*

| Emulsion Prepared with— | Percent Emulsion [1] | Percent Moisture at— | | | | | |
|---|---|---|---|---|---|---|---|
| | | Start | ½ Hr. | 1 Hr. | 1½ Hr. | 2 Hr. | 3 Hr. |
| Lignin Amine | 15.0 | 10.1 | 3.8 | 1.8 | 0.9 | 0.7 | 0.4 |
| Do | 17.5 | 12.0 | 5.6 | 3.4 | 2.2 | 1.7 | 0.8 |
| Do | 20.0 | 12.0 | 6.0 | 3.7 | 2.6 | 1.9 | 1.1 |
| Anionic | 15.0 | 12.0 | 6.9 | 5.4 | 4.2 | 3.3 | 2.6 |
| Do | 17.5 | 12.0 | 7.6 | 6.3 | 5.2 | 4.6 | 3.7 |
| Do | 20.0 | 11.3 | 7.6 | 6.5 | 5.4 | 4.8 | 4.2 |

[1] Based on the weight of dry aggregate.

The results clearly indicate that the slurry seal samples prepared from cationic asphalt emulsions formed with the aid of lignin amine dehydrate and set much faster than the conventional anionic slurry seal coatings. This property facilitates earlier opening of the pavement to traffic and reduces the risk of damage by rain.

In order to test abrasion resistance, similar felt pads coated with the two aforementioned emulsions, were dried to constant weight at 140° F., cooled, weighed and placed in a 77° F. water bath for one hour. After this, the samples were submerged in water in a pan of a specially designed "Wet Track Abrasion Tester" and abraded for five minutes. The compression effect in this test is produced by a short section of heavy rubber hose mounted on a horizontal arm of a motor-driven shaft and pressed against the test specimen (pad). The loss of material in grams per square foot gives the "wear value." Correlation of this test with actual field (on the road) performance has shown that the wear values of satisfactory pavement surfaces must be below 75.

Table III below shows results of several comparison tests of the lignin amine-emulsified cationic asphalt emulsions and a conventional anionic emulsion. It is readily seen that, whereas the anionic emulsion failed to produce a satisfactory seal coat, the use of as little as 20% of the cationic emulsion (based on dry weight of the aggregate) gives a seal coat of excellent abrasion resistance.

TABLE III

*Wear Values of Slurry Seal Coats*

| Emulsion Type | Percent Emulsion [1] | Wear Value (g./sq. ft.) |
|---|---|---|
| Lignin Amine | 15.0 | 222 |
| Do | 20.0 | 49 |
| Do | 25.0 | 24 |
| Anionic | 15.0 | 256 |
| Do | 20.0 | 187 |
| Do | 25.0 | 165 |

[1] Based on dry weight of the aggregate.

Effectiveness of the lignin amine emulsifier of the present invention for the production of satisfactory, lasting floor mastics has been tested by preparing mixes of cationic bituminous emulsions formulated by emulsifying asphalt in water with the aid of lignin amine, as indicated hereinabove for the cationic emulsions employed in the abrasion test. A number of floor slabs 4'0″ square and 1½″ thick have been prepared using such an emulsion, cement, sand and coarse aggregate, in conventional proportions. Upon dehydration and setting, the surface of the slabs was observed to be free of cracks and passed the standard bald indentation test employed in the construction industry. The surface showed no cracks even after three months of exposure outdoors.

The application of lignin amine, in accordance with the invention, as the emulsifying agent for the preparation of cationc asphalt emulsions permits satisfactory formulation of particular paving mixes with either siliceous or limestone aggregates which may contain as much as 20% by weight of fine aggregates of less than 200 mesh size. The previously observed handicaps of emulsion instability, breakdown and coagulation on contact with fine, low-grade aggregates, sand and cement, are eliminated by the use of the emulsions prepared with lignin amine-type emulsifiers. A perfect bond (good adhesion) between the asphalt binder and the aggregate, and a firmly sealed paving structure are made feasible. Consequently, valuable advances in the arts of bituminous slurry seal coatings, paving (road) base stabilization and floor mastics manufacture are achieved.

I claim:

1. An oil-in-water type cationic bituminous emulsion of improved mechanical stability, comprising from about 30 to about 75% by weght of bitumen, as the dispersed phase; from about 0.2 to about 2.0% by weight of a water-soluble salt of lignin amine product of reaction of lignin with an amine selected from the group consisting of primary and secondary amines and with a carbonylic compound selected from the group consisting of aldehydes and ketones, as the cation-active emulsifier for dispersing said bitumen in water; and water to make up 100% by weight, as the continuous phase, the pH of the emulsion being adjusted to a value in the range from about 1.0 to about 4.5.

2. An oil-in-water type cationic bituminous emulsion as defined in claim 1, wherein said bitumen is asphalt.

3. An oil-in-water type cationic bituminous emulsion as defined in claim 1, wherein said bitumen is asphalt in an amount from about 55 to about 65% by weight.

4. A cationic bituminous emulsion as defined in claim 1, having additionally incorporated therein, as an auxiliary emulsifier, from about 0.01% to about 2.0% by weight of a nonionic ethylene glycol polyether emulsifier.

5. A cationic bituminous emulsion as defined in claim 1 having additionally incorporated therein, as an auxiliary emulsifier from about 0.01 to about 2.0% by weight of a cation-active emulsifier from the group consisting of N-alkyl trimethylenediamines and alkyl-substituted imidazolines.

References Cited in the file of this patent

UNITED STATES PATENTS

| | | |
|---|---|---|
| 2,483,806 | Buckley et al. | Oct. 4, 1949 |
| 2,706,688 | Sommer et al. | Apr. 19, 1955 |
| 2,709,696 | Wiest et al. | May 31, 1955 |
| 2,863,780 | Ball | Dec. 9, 1958 |
| 3,061,974 | Fanwood et al. | Nov. 6, 1952 |

FOREIGN PATENTS

| | | |
|---|---|---|
| 573,265 | Canada | Mar. 31, 1959 |

OTHER REFERENCES

The Chemistry of Fatty Amines, publ. by Armour and Co., 1948, pp. 17 and 18.